April 22, 1930.  P. M. HOTCHKIN  1,755,298
COLOR FLOOD LIGHTING
Filed April 28, 1927
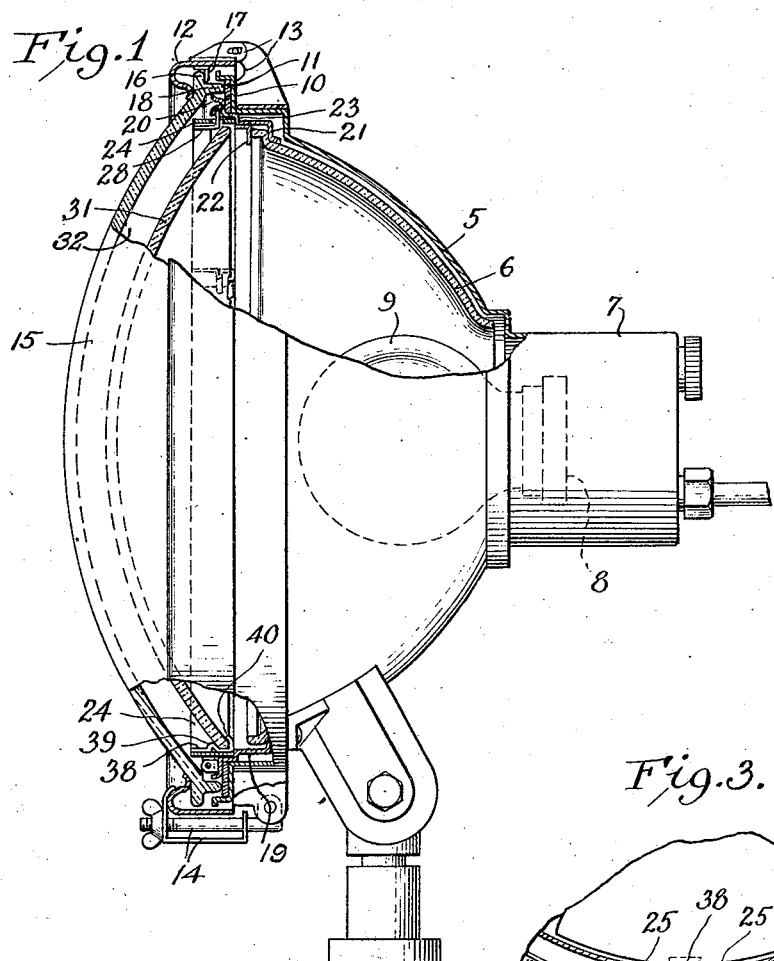
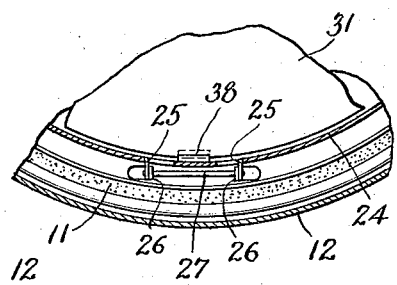
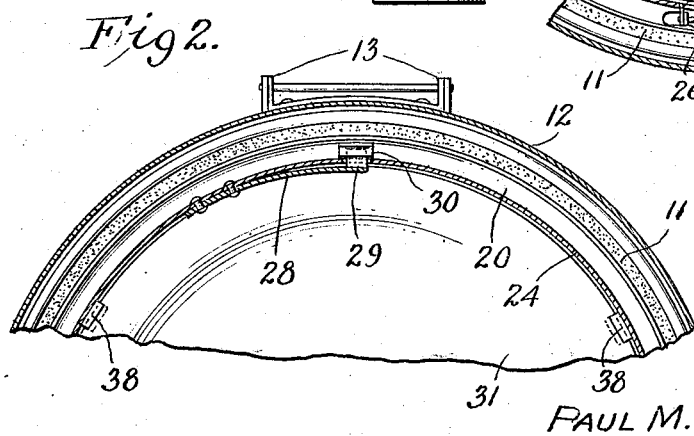
Inventor
PAUL M. HOTCHKIN.
By E. K. Lundy Att'y.

Patented Apr. 22, 1930

1,755,298

UNITED STATES PATENT OFFICE

PAUL M. HOTCHKIN, OF CHICAGO, ILLINOIS

COLOR FLOOD LIGHTING

Application filed April 28, 1927. Serial No. 187,283.

My present invention relates generically to the art of illumination known as flood-lighting which consists in directing a large volume of light-rays from a plurality or battery of projectors onto the object it is desired to illuminate, such as a building, a monument, or the like, with the result that the object, will stand out distinctly and in bright relief against the background or the unilluminated objects around it. In the use of flood-light projectors it has been discovered that the glass front or lens of the projector device frequently cracks due to differences in temperature upon its surfaces. The lamp or bulb used in floodlighting is of necessity of large candle-power, and is of high wattage, and being enclosed in the weatherproof projector housing the temperature within the housing is raised to an excessive degree. The projector is usually out-of-doors where it is subject to attack from all of the natural atmospheric elements as well as all of the changes thereof from sub-zero to hot summer temperatures. Hence there is always a variable difference in temperatures upon the opposite surfaces of the lens. Ordinary glass may of course be colored but is not adapted for use where there is a differential of temperature on its respective surfaces. Experimentation has also ascertained the fact that lens made from what is known as "heat-resisting" glass such as used in cooking utensils, but of a better quality of clearness, will generally withstand these variable temperatures and will give satisfaction so long as no attempt is made to color the glass. It has been found that the inherent chemical and physical properties of "heat-resisting" glass will not permit of the addition of colors during the process of manufacturing the glass and have the glass retain its heat-resisting characteristics when it is used in connection with the flood-lighting projector; and it has been ascertained that certain colors or tones when produced in the heat-resisting glass will cause the projector lenses to shatter and break sooner than when other colors or tones are used. It will be appreciated that heat-resisting glass may be produced in colors or tone for certain purposes, but said glass is not adapted to be used in the flood-light projector because of the variable inside and outside temperatures to which its surfaces are subjected. With this knowledge in mind, I have devised the herein structure for lenses of flood-light projectors in which the outer lens, which is subjected at all times to the atmospheric elements and variable temperatures, is produced from the ordinary uncolored heat-resisting glass, while the inner lens, which is protected from the atmospheric changes and is subject only to the temperatures within the housing, is made from ordinary commercial glass that has been colored in the process of manufacture to the desired tone or tones. In this connection my improvements have been so designed that the colored glass lens may be readily inserted into or removed from the projector housing without altering any of the parts of the latter, and if desired the colored lens may be sold to consumers separately as an accessory whenever needed. This will afford a considerable saving to the user because of the fact that, aside from the breakage the heat-resisting lenses are quite expensive to produce in colors. My improvements have further advantages due to the fact that any desired colors may be utilized or purchased whenever necessary without having to keep on hand a quantity of the expensive heat-resisting colored lenses.

My present invention has numerous objects in view, among which are the production of a device of the character described that is novel in construction, economical to manufacture, effective in performing the functions for which it is designed, and is compact in the arrangement and disposition of its parts. I prefer to carry out my invention, and to accomplish the divers objects thereof, in substantally the manner hereinafter fully described and as more particularly pointed out in the claims, reference being here made to the accompanying drawings that form a part of this specification.

In the drawings:—

Figure 1 is a vertical side elevation of a flood-light projector showing my improvements.

Figure 2 is a sectional detail of the upper segment of the structure shown in Figure 1 looking at the front of the same.

Figure 3 is a view similar to Figure 2 of the lower segment of the structure.

The drawings illustrate a preferred or typical embodiment of my invention, and in these drawings, so far as possible, I have employed the same reference characters to designate similar or like parts wherever they appear throughout the several views.

The projector consists of a substantially conically shaped housing or casing 5 that conforms to the shape of the reflector 6 that is mounted within the same for projecting the light out of the front of the housing, and at the rear of the housing there is a cylindrical extension 7 within which an electric socket 8 is suitably mounted to receive the bulb or lamp 9, or other source of illumination. An L-shaped flange 10 extends radially from the outer edge of the housing 5 and provides a seat for a gasket 11 that is secured thereto by rivets or in any other suitable manner. A door-frame 12 has its upper portion swingingly connected to the corresponding portions of housing 5 by means of the elements 13 and at its lower segment said door-frame is secured in position by the clamping lock-bolt 14. The door-frame 12 is of annular shape formed from a metal stamping to receive the exterior lens 15, that is of concavo-convex section and is made from what is commercially known as "heat-resisting" glass so that it will withstand the attack of atmospheric elements. Said lens is uncolored because of the fact, as above stated, that the coloring of heat-resisting glass decreases its resisting properties to such an extent as to make it practically non-heating-resisting. The periphery of the outer lens has an angular flange of L-shape section projecting therefrom with the angular corner thereof at the edge of the lens. The shorter member 16 of the flange projects obliquely and outwardly into the door frame 12 and is engaged by L-shaped retaining clips 17 that project inwardly from the door frame and secure the lens in position. The longer member 18 of the flange is at a right angle to the other member 16 and is adapted when the door is closed and latched, to press into the gasket 11 and thereby seal the front opening of the housing from the weather.

In order to mount the reflector within the housing there is provided an annular carrier 19 of irregular shape in cross-section, the outer portion of which is formed with a flange 20 that extends over the inner edge and a portion of the surface of gasket 11 and is secured in desired position by means of the rivets that hold the gasket in its seat. The inner portion of the carrier has an inwardly curved flange 21 against which the rim of the reflector is held by means of L-shape clips 22 that are secured to the carrier in front of the edge of the reflector.

Intermediate its inner and outer edges the carrier is provided with an angular groove 23 to receive a portion of a ring 24 for removably mounting the colored lens within the projector. The lower segment of this ring 24 is provided with spaced stamp-out lateral ears 25 that coact with corresponding ears 26 stamped out of the reflector carrier so that a cotter-pin or other pivot element 27 may be passed through the ears to hingedly and removably mount the rim on the reflector carrier. A spring metal strip 28 is secured at one of its ends to the inner surface of the ring 24 and at its opposite end has an outwardly bent lateral tongue 29 that extends through a slot in the ring and engages back of a lip 30 that is pressed out of the adjacent portion of the reflector carrier. By withdrawing the tongue 29 below the edge of the lip 30 the upper segment of ring 24 may be moved away from the reflector carrier 19 after which the cotter-pin 27 may be withdrawn from the ears 25 and 26 to permit the removal of the ring 24.

The ring 24 has a colored lens 31 mounted within its inner circumference, said lens being of concavo-convex shape that corresponds substantially with the curvature of the outer lens 15 that is mounted in the door-frame. It will be seen that the lenses are separated from each other so that an insulating air-space 32 is provided between them, which protects the colored lens 31 from the atmospheric elements that attack the exterior of the housing and door structure. The colored lens may thus be made from ordinary glass that is colored to the desired tone which is considerably cheaper than the heat resisting lens and being entirely within the housing and protected from atmospheric elements by the air space 32 it is not subject to attack from said elements due to changes in outside temperatures and therefore will not break under ordinary service or operating conditions.

Any suitable means may be provided to secure the colored lens 31 upon the ring 24. I have shown herein suitable retainers that consist of strips of metal 38 secured at spaced intervals to the interior of the ring and are each provided intermediate their ends with beads 39 against which the lens 31 rests when assembling the parts, and after being so positioned the outer portion 40 of the strips are bent up against the opposite face of the lens 31 thereby retaining the latter in the ring.

It will be noted from the foregoing that the colored lens is readily removable from the reflector housing and a lens of another color may be conveniently substituted therefor whenever it is desired to change the tone of the light thrown out by the projector upon the object being illuminated. The ring may be conveniently carried in stock with lenses of the different colors and these units may be purchased by the user at a moderate price without having to go to the expense heretofore demanded to replace a door-lens that is made of colored heat-resisting glass.

What I claim is:—

1. In a flood-light projector an open front housing, reflector supporting means positioned in said housing back of the opening, a reflector mounted in said means, lens-holding means mounted on said supporting means, a colored glass lens carried by said holding means, and a closure plate of heat-resisting glass for the front of said housing and spaced from said colored lens whereby the latter is entirely enclosed within the projector and protected from atmospheric elements and colored light is projected from said housing through the heat resisting glass.

2. A flood-light projector comprising a housing for a source of illumination and open at its front, a door-frame coactable with the front of the housing, a light transmitting lens mounted in said door-frame, a light filter interposed between the light source and said lens adapted to transmit colored light to said lens, a reflector and support therefor within the housing, an annular frame, releasably mounted on said reflector support, in which said filter is secured whereby the latter is capable of ready removal from the projector.

Signed at Chicago, in the county of Cook and State of Illinois, this 9th day of April, 1927.

PAUL M. HOTCHKIN.